United States Patent
Gray

(10) Patent No.: US 11,259,056 B2
(45) Date of Patent: Feb. 22, 2022

(54) METHOD AND SYSTEMS FOR CREATING VIEWING IMPRESSIONS DURING TRICK PLAY OPERATIONS

(71) Applicant: Comcast Cable Communications, LLC, Philadelphia, PA (US)

(72) Inventor: Brian Gray, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 15/388,579

(22) Filed: Dec. 22, 2016

(65) Prior Publication Data
US 2018/0184135 A1 Jun. 28, 2018

(51) Int. Cl.
| | |
|---|---|
| H04N 21/2387 | (2011.01) |
| H04N 21/81 | (2011.01) |
| H04N 21/6587 | (2011.01) |
| H04N 21/234 | (2011.01) |
| H04N 21/845 | (2011.01) |
| H04N 21/472 | (2011.01) |
| H04N 21/4147 | (2011.01) |
| H04N 21/235 | (2011.01) |

(52) U.S. Cl.
CPC ... *H04N 21/2387* (2013.01); *H04N 21/23424* (2013.01); *H04N 21/47202* (2013.01); *H04N 21/6587* (2013.01); *H04N 21/812* (2013.01); *H04N 21/845* (2013.01); *H04N 21/2353* (2013.01); *H04N 21/4147* (2013.01)

(58) Field of Classification Search
CPC ......... H04N 21/2387; H04N 21/23424; H04N 21/2353; H04N 21/4147; H04N 21/47202; H04N 21/6587; H04N 21/812; H04N 21/845; H04N 12/47202

See application file for complete search history.

(56) References Cited

U.S. PATENT DOCUMENTS

| | | | |
|---|---|---|---|
| 6,961,954 B1* | 11/2005 | Maybury | G11B 27/28 725/53 |
| 7,333,712 B2* | 2/2008 | Jeannin | G06F 17/30843 386/248 |
| 7,412,149 B2 | 8/2008 | Cohen et al. | |
| 8,079,052 B2* | 12/2011 | Chen | G06Q 30/0272 725/102 |
| 2002/0090198 A1* | 7/2002 | Rosenberg | G11B 27/036 386/228 |
| 2002/0144262 A1* | 10/2002 | Plotnick | G11B 27/005 725/32 |
| 2005/0097599 A1* | 5/2005 | Plotnick | G11B 27/005 725/32 |
| 2005/0114909 A1* | 5/2005 | Mercier | G11B 20/00086 725/141 |
| 2007/0154165 A1 | 7/2007 | Hemmeryckx-Deleersnijder et al. | |

(Continued)

FOREIGN PATENT DOCUMENTS

WO   WO-2010/036308 A1   4/2010

*Primary Examiner* — Sumaiya A Chowdhury
(74) *Attorney, Agent, or Firm* — Ballard Spahr LLP

(57) ABSTRACT

Some aspects of the disclosure relate to a system and methods for creating a viewing impression that can comprise selecting a video frame from a content item based on interest or value in the video frame. Another version of the content, such as a trick file, can be created by inserting one or more copies of the video frame, for example, adjacent to one another.

32 Claims, 6 Drawing Sheets

(56) References Cited

U.S. PATENT DOCUMENTS

| | | | |
|---|---|---|---|
| 2008/0152300 A1* | 6/2008 | Knee | G11B 27/005 |
| | | | 386/250 |
| 2008/0235741 A1* | 9/2008 | Ljolje | H04N 5/783 |
| | | | 725/89 |
| 2009/0222849 A1* | 9/2009 | Peters | H04N 21/4147 |
| | | | 725/28 |
| 2010/0166389 A1* | 7/2010 | Knee | G11B 27/005 |
| | | | 386/241 |
| 2010/0218208 A1* | 8/2010 | Holden | H04N 21/812 |
| | | | 725/32 |
| 2016/0127800 A1* | 5/2016 | Weast | H04N 5/76 |
| | | | 725/32 |
| 2016/0314803 A1* | 10/2016 | Stone | G10L 25/48 |

* cited by examiner

METHOD AND SYSTEMS FOR CREATING VIEWING IMPRESSIONS DURING TRICK PLAY OPERATIONS

BACKGROUND

Viewers often rewind or fast forward through content. During such operations, there is a chance that at last the most an important part of the content can be skipped over completely or shown for too short a duration.

For users that stream content, trick play operations can be difficult to present due to, e.g., the content having to be delivered to faster than intended for normal playback.

These and other shortcomings are addressed by the methods and systems disclosed herein.

SUMMARY

It is to be understood that both the following general description and the following detailed description are exemplary and explanatory only and are not restrictive. Provided are methods and systems for creating viewing impressions during trick play operations.

Content processing (e.g., ingestion) can comprise obtaining, importing, and processing a content asset for later use and/or storage in a database. Content processing can further comprise altering individual files of the content asset by editing and/or formatting them. In some aspects, the content processing can comprise encoding the received content asset for transmission and display. For example, the content asset can be encoded using, MPEG-2, MPEG-4, and/or H.264 video encoding standards. In particular, the content processing can comprise processing a content asset that includes impression-based content (e.g., advertisements, product placement, etc.). Impression-based content can refer to content that is sponsored based on a number of impressions (e.g., views) that the content receives. Further, the sponsor of the impression-based content may seek to ensure that at least a portion of the content is viewed in a particular manner, despite varying playback conditions (e.g., a particular length of the content, despite fast-forward instructions from the viewer).

When a content asset comprising impression-based content is processed (e.g., ingested), the content asset can further comprise metadata. In some aspects, the metadata can comprise information related to the content asset. In particular, the metadata can comprise information related to impression-based content contained in the content asset. For example, the metadata can comprise impression information indicating one or more particular frames that comprise placed products for content, frames that comprise company and/or brand logos for advertisements, and/or the like.

In some aspects, content asset processing, such as content asset ingestion or other processing, can comprise creation of one or more pre-generated trick play video files, which may be streamed or otherwise transmitted to a device or user. For example, one or more fast forward video files (e.g., a 2× speed fast forward file, a 4× speed fast forward file, etc.) and/or one or more rewind files (e.g., a 1× speed rewind file, a 2× speed rewind file, etc.) can be pre-generated. The particular frames, segments, video fragments, and/or the like indicated in the impression information can be mandatorily included in the one or more pre-generated trick play video files.

In some aspects, a plurality of copies of each of the particular frames can be included contiguously within each of the trick play video files. The effect of including a plurality of contiguous copies of each of the particular frames within the trick play video files can be an impression that the video content "hiccups" or "freezes" on the particular frame for a short time. As an example, when video is displayed at 30 frames per second, 5 to 15 copies of each of the particular frames can be included contiguously within the trick play video files. Accordingly, each of the particular frames can be displayed for ⅙ to ½ of a second.

In other aspects, content asset processing (e.g., the content asset ingestion) can comprise quantizing the content (e.g., dividing the content into a series of discrete portions) for a pause function. In some aspects, the content asset can be quantized based on the one or more particular frames identified in the metadata. For example, when a pause command is received within a particular time threshold of one of the particular frames, the particular frame could be displayed when the pause command is received. For example, the time duration could be one second, such that any pause command received within one second of the particular frame would result in the particular frame being displayed during the pause operation.

As a particular example, metadata of the content asset can comprise information indicating a particular frame of the content asset that contains impression-based content, such as a product placement (e.g., a character in a movie drinking a particular brand of soft drink). The content asset can be processed such that, when a pause command is received from a user within one second of the frame identified in the metadata, the frame identified during the metadata is displayed for a duration of the pause.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
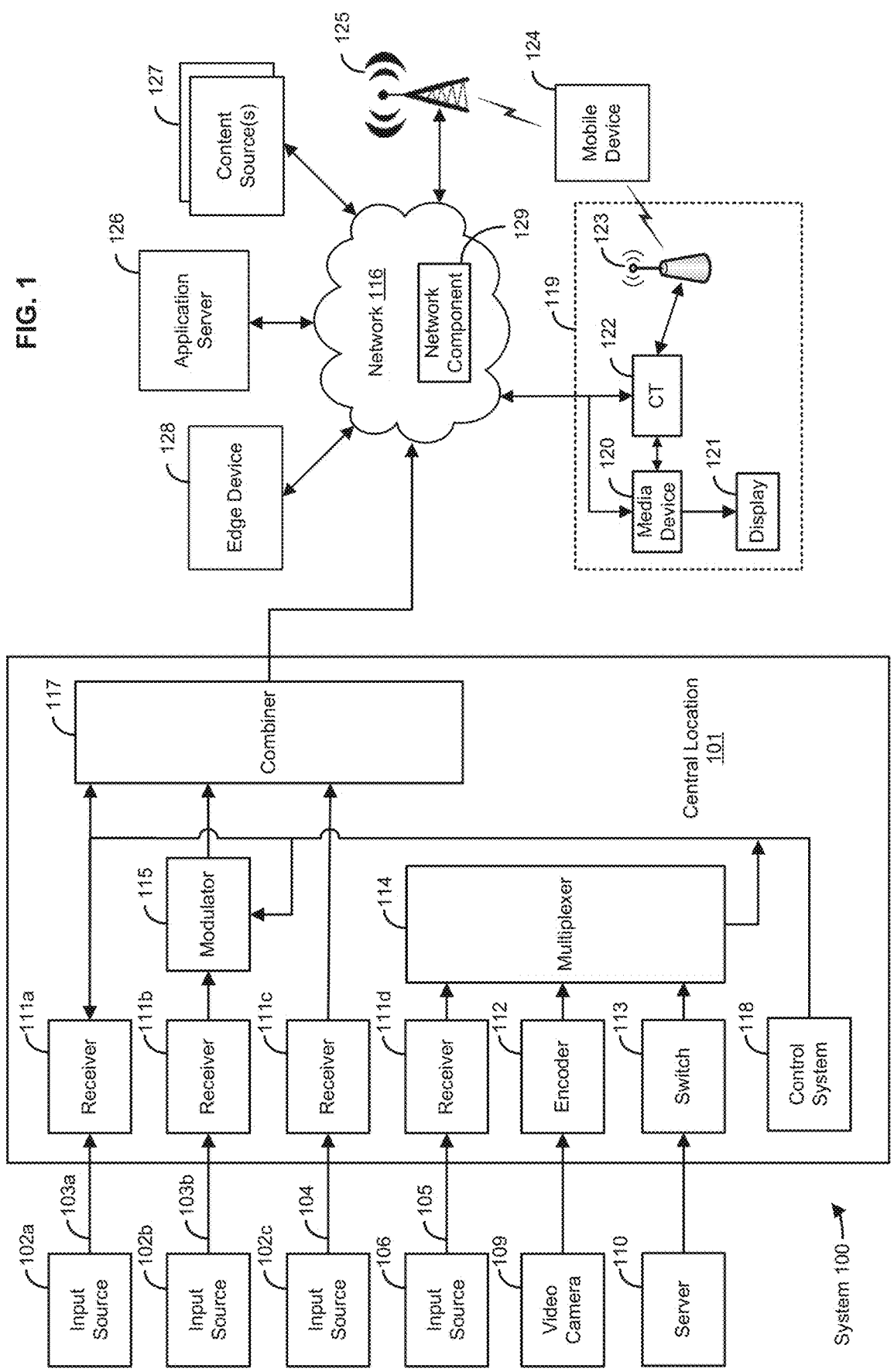
FIG. 1 is block diagram illustrating various aspects of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value.

Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods and systems for creating viewing impressions during trick play operations such as fast forwarding and rewinding, as well as pausing. Since the advent of fast forwarding with video cassette recorders (VCRs), advertisers have adopted new means of presenting their product logos to viewers. One of these methods comprises product placement, where a particular product is featured within the content. Other techniques comprise adjusting placement and/or duration of logo placement within an advertisement. Additionally, in some cases where the technology used to display the content to the user is controlled by third parties, policy can be put in place to disable trick play operations during at least a portion of the playback, thereby requiring that the advertisements be displayed as intended.

Trick play mode is a feature of digital video systems including Digital Video Recorders (DVRs) and Video-on-Demand (VOD) systems that can mimic visual feedback given during fast-forward and rewind operations that were provided by analog systems such as VCRs. Trick play manipulates the video file to include only a subset of frames.

With an analog system, the visual fast-forward/rewind effect can be generated by transmitting the frames faster and/or in reverse; there can be a loss of frame synchronization or 'tearing' but is accepted by the industry. With a digital system, it is unlikely that a decoder can process a digital stream significantly faster than normal (e.g., to accomplish a fast forward effect), and/or backwards (e.g., to accomplish a rewind effect). Therefore, a subset of frames can be presented to the decoder to achieve these effects.

In video compression systems such as MPEG-2 and H.264, many frames depend on other frames within the stream for display, and hence cannot be decoded independently. Only certain "I" or "Intra" frames are independent. As a result, a system offering trick mode can select those I-frames for display, which requires analysis of the digital stream either at the time of playback or in advance of playback.

In a single-user disk-based system, it is possible to scan a content asset in real time to locate the independent frames, but in a network-based system, the bandwidth allocated to each user device can be fixed, so the server has to use pre-generated 'hint' or 'index' information to locate suitable frames, and then play them out at the selected fast-forward or rewind speed within the original bandwidth envelope. Alternatively, the server may pre-generate an entirely new video file with at least one forward and backward speed and switch to it when requested.

The methods and systems disclosed provide for viewing impressions during trick play operations be processing a content asset during processing (e.g., ingestion). When a content asset comprising impression-based content is processed, the content asset can further comprise metadata. In some aspects, the metadata can comprise a separate file associated with the content asset. In other aspects, the metadata can be stored as a portion of the content asset. The metadata can comprise impression information indicating one or more particular frames that comprise placed products for content, frames that comprise company and/or brand logos for advertisements, and/or the like. In some aspects, the impression information can comprise, for example, one or more of a time codes, frame numbers, or the like associated with the one or more particular frames.

In some aspect, the content asset processing can comprise creation of one or more pre-generated trick play video files. The particular frames indicated in the impression information can be mandatorily included in the one or more pre-generated trick play video files. In some aspects, a plurality of copies of each of the particular frames can be included contiguously within each of the trick play video files. The effect of including a plurality of contiguous copies of each of the particular frames within the trick play video files can be an impression that the video content "hiccups" or "freezes" on this frame for a short time. As an example, when video is displayed at 30 frames per second, 5 to 15 copies of each of the particular frames can be included contiguously within the trick play video files. Accordingly, each of the particular frames can be displayed for ⅙ to ½ of a second.

In other aspects, a pause function can be quantized based on the one or more particular frames identified in the metadata. For example, when a pause command is received within a particular time threshold of one of the particular frames, the particular frame could be displayed when the pause command is received. For example, the time duration could be one second, such that any pause command received within one second of the particular frame would result in the particular frame being displayed during the pause operation.

FIG. 1 illustrates various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via a distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as an encoder 112 are included for encoding local content or a video camera 109 feed. A switch 113 can provide access to the server 110, which can be a Pay-Per-View server, a data server, an internet router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. In an aspect, the network 116 can comprise a content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

In an aspect, a multitude of users can be connected to the network 116 at one or more of the user locations. At the user location 119, a media device 120 can demodulate and/or decode, if needed, the signals for display on a display device 121, such as on a television set (TV) or a computer monitor. For example, the media device 120 can comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet switched network). The media device 120 can comprise a set-top box, a digital streaming device, a gaming device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or satellite dish.

In an aspect, the communication terminal 122 can be located at the user location 119. The communication terminal 122 can be configured to communicate with the network 116. The communications terminal 122 can comprise a modem (e.g., cable modem), a router, a gateway, a switch, a network terminal (e.g., optical network unit), and/or the like. The communications terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 can be configured to provide network access via a variety of communication protocols and standards, such as Data Over Cable Service Interface Specification.

In an aspect, the user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 can be implemented as a single device.

In an aspect, the user location 119 may not be fixed. By way of example, a user can receive content from the network 116 on the mobile device 124. The mobile device 124 can comprise a laptop computer, a tablet device, a computer station, a personal data assistant (PDA), a smart device (e.g., smart phone, smart apparel, smart watch, smart glasses). GPS, a vehicle entertainment system, a portable media player, a combination thereof, and/or the like. The mobile device 124 can communicate with a variety of access points (e.g., at different times and locations or simultaneously if within range of multiple access points). For example, the mobile device 124 can communicate with a second access point 125. The second access point 125 can be a cell tower, a wireless hotspot, another mobile device, and/or other remote access point. The second access point 125 can be within range of the user location 119 or remote from the user location 119. For example, the second access point 125 can be located along a travel route, within a business or residence, or other useful locations (e.g., travel stop, city center, park, etc.).

In an aspect, the system 100 can comprise an application device 126. The application device 126 can be a computing device, such as a server. The application device 126 can provide services related to applications. For example, the application device 126 can comprise an application store. The application store can be configured to allow users to purchase, download, install, upgrade, and/or otherwise manage applications. For example, the application device 126 can be configured to allow users to download applications to a device, such as the mobile device 124, communications terminal 122, the media device 120, the display device 121, and/or the like. The application device 126 can run one or more application services to provide data, handle requests, and/or otherwise facilitate operation of applications for the user.

In an aspect, the system 100 can comprise one or more content source(s) 127. The content source(s) 127 can be configured to provide content (e.g., video, audio, games, applications, data) to the user. The content source(s) 127 can be configured to provide streaming media, such as on-demand content (e.g., video on-demand), content recordings, downloadable media, and/or the like. For example, the content source(s) 127 can be managed by third party content providers, service providers, online content providers, over-the-top content providers, and/or the like. The content can be provided via a subscription, by individual item purchase or rental, and/or the like. The content source(s) 127 can be configured to provide the content via a packet switched network path, such as via an internet protocol (IP) based connection. In an aspect, the content can be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

In an aspect, the system 100 can comprise an edge device 128. The edge device 128 can be configured to provide content, services, and/or the like to the user location 119. For example, the edge device 128 can be one of a plurality of edge devices distributed across the network 116. The edge device 128 can be located in a region proximate to the user location 119. A request for content from the user can be directed to the edge device 128 (e.g., due to the location of the edge device and/or network conditions). The edge device 128 can be configured to package content for delivery to the user (e.g., in a specific format requested by a user device), provide the user a manifest file (e.g., or other index file describing segments of the content), provide streaming content (e.g., unicast, multicast), provide a file transfer, and/or the like. The edge device 128 can cache or otherwise store content (e.g., frequently requested content) to enable faster delivery of content to users.

In an aspect, the network 116 can comprise a network component 129. The network component 129 can comprise any device, module, and/or the like communicatively coupled to the network 116. For example, the network component 129 can comprise a router, a switch, a splitter, a packager, a gateway, a encoder, a storage device, a multiplexer, a network access location (e.g., tap), physical link, and/or the like.

In an exemplary embodiment, the methods and systems disclosed can be located within, for example, one or more of the content sources 127. Each of the one or more content sources 127 can receive content for processing (e.g., ingestion). Content processing can comprise obtaining, importing, and processing a received content asset for later use and/or storage in a database. Content processing can further comprise altering individual files of the content asset by editing and/or formatting them. In some aspects, the content processing can comprise encoding the received content asset for transmission and display. For example, the content asset can be encoded using, MPEG-2 and/or H.264 video encoding standards. In some aspects, the content asset can be provided by a third party content provider.

When a content asset comprising impression-based content is processed (e.g., ingested) at the content source(s) 127, the content asset can further comprise metadata. The metadata can comprise impression information indicating one or more particular frames that comprise placed products for content, frames that comprise company and/or brand logos for advertisements, and/or other items of interest.

In some aspect, the content asset processing can comprise creation of one or more pre-generated trick play video files. For example, the content source(s) 127 can create (e.g., pre-generate) one or more fast forward video files (e.g., a 2× speed fast forward file, a 4× speed fast forward file, etc.) and/or one or more rewind files (e.g., a 1× speed rewind file, a 2× speed rewind file, etc.). The particular frames indicated in the impression information can be mandatorily included in the one or more pre-generated trick play video files.

In some aspects, the content source(s) 127 can insert a plurality of copies of each of the particular frames contiguously within each of the trick play video files. The effect of including a plurality of contiguous copies of each of the particular frames within the trick play video files can be an impression that the video content "hiccups" or "freezes" on the particular frame for a short time. As an example, when video is displayed at 30 frames per second, 5 to 15 copies of each of the particular frames can be inserted contiguously within the trick play video files. Accordingly, each of the particular frames can be displayed for ⅙ to ½ of a second.

The content source 127 can also quantize the content for a pause function. In some aspects, the content asset can be quantized based on the one or more particular frames identified in the metadata. For example, in response to receiving a pause command within a time threshold of one of the particular frames, the particular frame could be displayed when the pause command is received. For example, the time duration could be one second, such that any pause command received within one second of the particular frame would result in the particular frame being displayed during the pause operation. In other aspects, in response to receiving a pause command, the content source can provide one or more frames of a trick play video file.

In an aspect, the methods and systems can utilize digital audio/video compression such as MPEG, or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-2, and MPEG-4 standards are hereinafter referred to as MPEG. In an MPEG encoded transmission, content and other data are transmitted in packets, which collectively make up a transport stream. Additional information regarding transport stream packets, the composition of the transport stream, types of MPEG tables, and other aspects of the MPEG standards are described below. In an exemplary embodiment, the present methods and systems can employ transmission of MPEG packets. However, the present methods and systems are not so limited, and can be implemented using other types of transmission and data.

Figure 2:
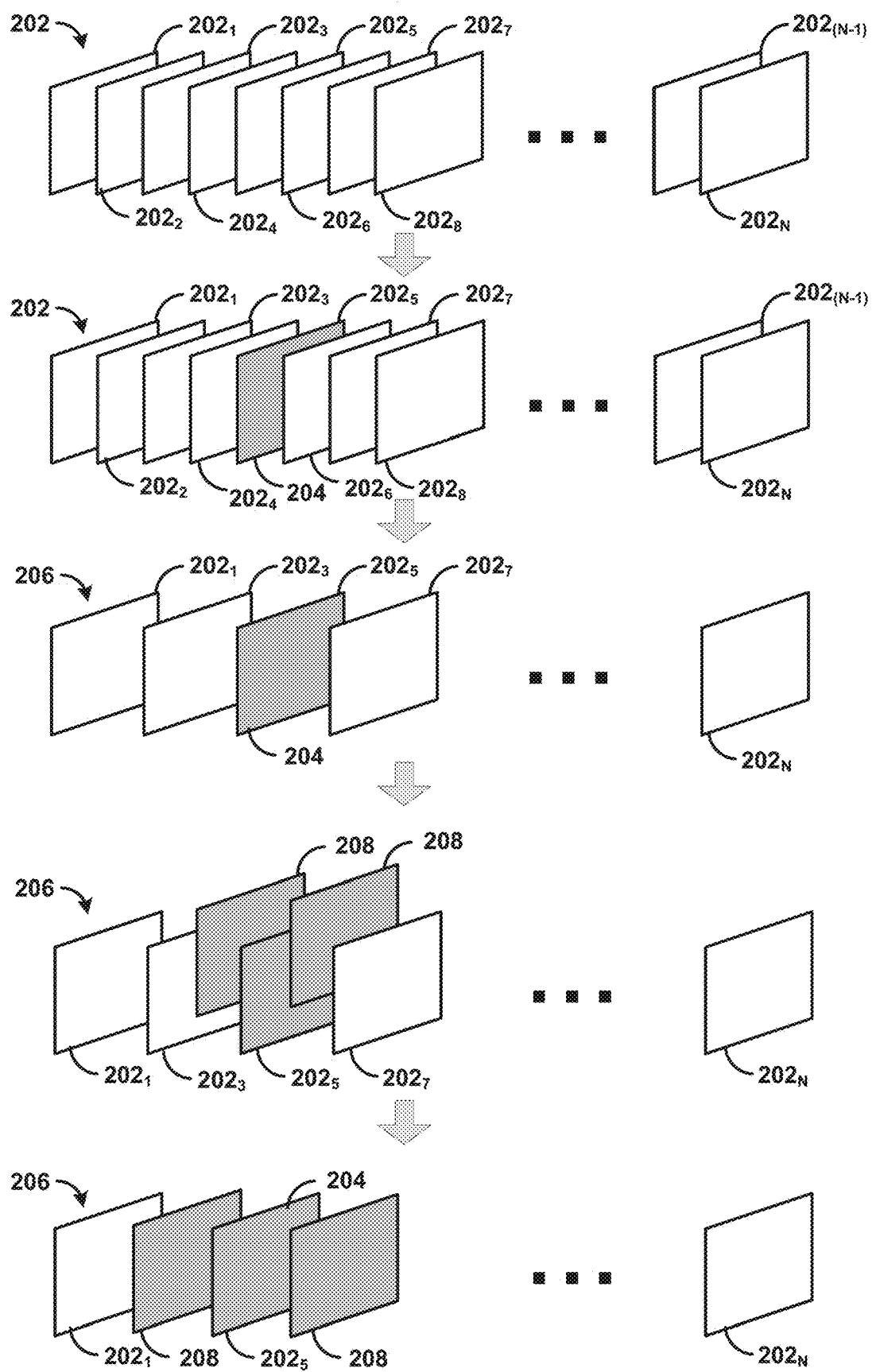
FIG. 2 is an illustration of a sample content processing.

FIG. 2 shows a sample process for creating second content from first content. A content asset 202 comprising plurality of frames $202_1$-$202_N$ of first content can be received. For example, the plurality of frames $202_1$-$202_N$ can be received as part of content processing. In some aspects, the content asset 202 can further comprise metadata. One video frame of the plurality of frames $202_1$-$202_N$ can be determined as a selected video frame 204. As shown in FIG. 2, the selected video frame 204 can be, for example, frame $202_5$ from among the plurality of frames $202_1$-$202_N$.

In some aspects, second content can be crated based on the first content. In some aspects, the second content can comprise trick play content (e.g., fast forward content, rewind content, and the like). The second content can comprise, for example, a subset 206 of the plurality of frames $202_1$-$202_N$ of the first content. The subset 206 can comprise at least the selected video frame 204. In some aspects, the subset 206 can comprise a mathematical fraction of the plurality of frames $202_1$-$202_N$ based on a desired perceived playback rate. For example, for a desired perceived 2× playback rate (e.g., a 2× speed fast forward), the subset 206 can comprise exactly half as many frames as the plurality of frames $202_1$-$202_N$.

In some aspects, one or more copies 208 of the selected video frame 204 can be inserted into the subset 206. For example, FIG. 2 shows that two copies 208 are inserted. The copies can be inserted contiguously, and can be adjacent to the selected video frame 204. In some aspects, the selected video frame 204 can precede each of the copies 208 chronologically. In other aspects, the copies can be inserted such that the selected video frame 204 is immediately subsequent to the copies 208. In still other aspects, the copies 208 can surround the selected frame 204, as shown in FIG. 2.

In some aspects, inserting the one or more copies 208 of the selected video frame 204 can further comprise removing on or more frames of the subset 206. For example, when a particular number of copies of the video frame are inserted, a corresponding number of frames can be deleted from the subset 206. For example, as shown in FIG. 2, two copies 208 can be inserted and two frames (e.g., frames $202_3$ and $202_7$) can be deleted. In some aspects the removed frames can be contiguous. In some aspects, the removed frames can be disjoint.

Figure 3:
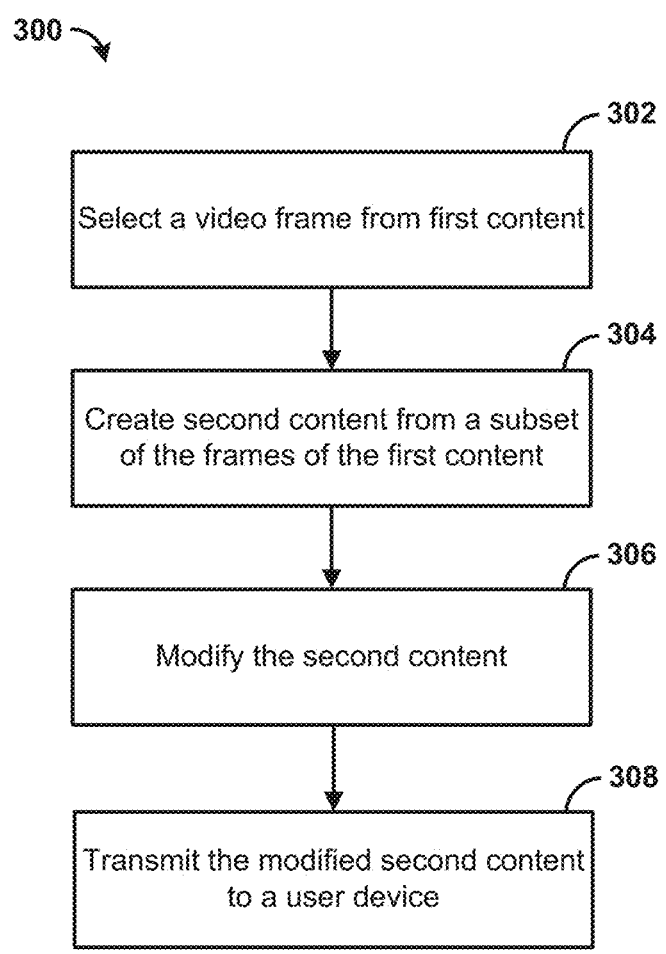
FIG. 3 is a flowchart illustrating an example method.

FIG. 3 shows an example method 300. In step 302, a video frame can be selected from a plurality of video frames of first content. In some aspects, the selected video frame can be selected by one or more computing devices. In some aspects, the selected video frame can be selected based on a presence of an item of interest in the video frame. The item of interest can be, for example, a particular product, a company logo, a show logo, a particular still shot from the content, a title screen, and/or the like. In some aspects, the selected video frame can comprise an advertisement. In some aspects, the selected video frame can be selected by a content provider. In other aspects, the selected video frame can be selected by a service provider. The first content can comprise a video portion and an audio portion. In some aspects, the first content can be configured to be presented at a first playback speed. For example, the first playback speed can be a normal (e.g., 1x speed) playback speed.

In some aspects, the method 300 can further comprise a step of processing (e.g., ingesting) a content asset comprising the first content. Content processing can comprise obtaining, importing, and processing the content asset for later use and/or storage in a database. Content processing can further comprise altering individual files of the content asset by editing and/or formatting them. In some aspects, the content processing can comprise encoding the received content asset for transmission and display. For example, the content asset can be encoded using, MPEG-2 and/or H.264 video encoding standards. In some aspects, the content asset can comprise the first content and metadata associated with the first content. The metadata associated with the first content can comprise a separate metadata file associated with the first content. Alternatively, the metadata associated with the first content can be stored as a part of the first content.

In some aspects, the selecting the video frame in step 302 can be performed in response to the content processing, such as content ingestion. For example, the received metadata can comprise an indicator indicating a particular frame of the first content. In some aspects, the video frame is selected based on the received metadata.

In step 304, second content can be created based on the first content. In some aspects, the second content can be created by selecting a subset of the plurality of video frames of the first content. The subset can be selected such that it includes the selected video frame. The second content can comprise at least a video portion. The second content can further be configured to be presented at a second playback speed. In some aspects the second playback speed can be a perceived playback speed. That is, the second content can be assembled by arranging the subset of the plurality of frames, oriented either forward or backward. As a specific example, the modified second content can comprise even numbered frames from the first content, arranged sequentially, such that the second content has a perceived speed of 2× when compared to the first content. As another example, the second content can comprise even numbered frames from the first content, arranged in reverse sequential order, such that the second content has a perceived speed of 2× in reverse when compared to the first content. In some aspects, the second playback speed can be faster than the first playback speed. For example, the second playback speed can be a multiple of the first playback speed (e.g., the second playback speed can be a 2× speed, a 4× speed, etc.).

In step 306, the second content can be modified by inserting one or more copies of the selected video frame into the second content adjacent to the selected video frame to form modified second content. In some aspects, inserting the one or more copies of the selected video frame can comprise determining a display duration associated with the selected video frame. The display duration can comprise a period of time determined to create an impression on a viewer. The display duration can be, for example, a time period between ⅙ of a second and ½ of a second. In some aspects, the display duration can be selected based on one or more of an established custom, a result of focus group and/or usability testing, and/or a negotiated advertising contract. Inserting the one or more copies of the selected video frame can comprise inserting a number of copies of the video frame so that when frames are displayed at the second playback speed, the number of copies of the selected video frame are displayed for the display duration. As an example, when the second playback speed is 30 frames per second, if the display duration is ⅙ second, then 5 copies of the selected video frame are inserted; if the display duration if ½ second, then 15 copies of the selected video frame are inserted.

In some aspects, inserting the one or more copies of the selected video frame can further comprise removing one or more frames from second content. For example, when the number of copies of the selected video frame are inserted, a corresponding number of frames can be deleted from the second copy. In some aspects the removed frames can be contiguous. In some aspects, the removed frames can be disjoint.

In step 308, the first content, the second content, and/or the modified second content can be transmitted to a user device. In some aspects, the first content and the modified second content can be transmitted as part of an MPEG stream. The first content and the modified second content can be transmitted, for example, in response to a user request for the content asset.

Figure 4:
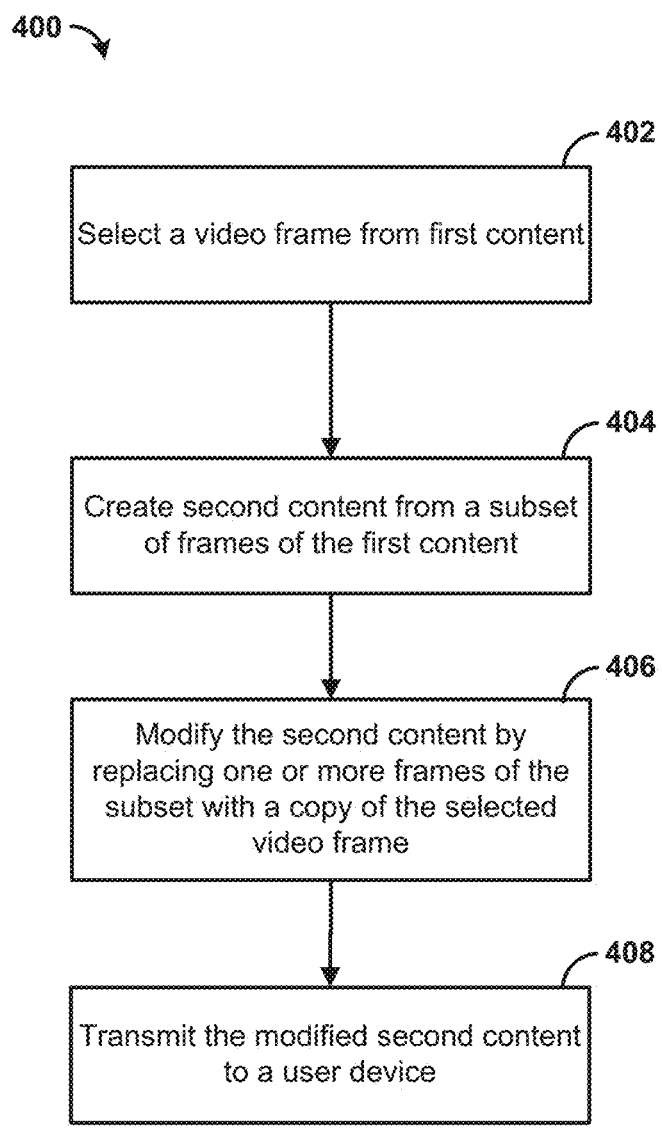
FIG. 4 is a flowchart illustrating an example method.

FIG. 4 shows an example method 400. In step 402, a video frame can be selected from a plurality of video frames of first content. In some aspects, the selected video frame can be selected by one or more computing devices. In some aspects, the selected video frame can be selected based on a presence of an item of interest in the video frame. The item of interest can be, for example, a particular product, a company logo, a show logo, a particular still shot from the content, a title screen, and/or the like. In some aspects, the selected video frame can comprise an advertisement. In some aspects, the selected video frame can be selected by a content provider. In other aspects, the selected video frame can be selected by a service provider. The first content can comprise a video portion and an audio portion. In some aspects, the first content can be configured to be presented at a first playback speed. For example, the first playback speed can be a normal (e.g., 1× speed) playback speed.

In some aspects, the method 400 can further comprise a step of processing (e.g., ingesting) a content asset comprising the first content. Content processing can comprise obtaining, importing, and processing the content asset for later use and/or storage in a database. Content processing can also comprise altering individual files of the content asset by editing and/or formatting them. In some aspects, the content processing can comprise encoding the received content asset for transmission and display. For example, the content asset can be encoded using, MPEG-2 and/or H.264 video encoding standards. In some aspects, the content asset can comprise the first content and metadata associated with the first content. The metadata associated with the first content can comprise a separate metadata file associated with the first content. Alternatively, the metadata associated with the first content can be stored as a part of the first content.

In some aspects, the selecting the video frame in step 402 can be performed in response to the content processing. For example, the received metadata can comprise an indicator indicating a particular frame of the first content. In some aspects, the selected video frame is selected based on the received metadata.

In step 404, second content can be created based on the first content. In some aspects, the second content can be created by selecting a subset of the plurality of frames of the first content. The subset can be selected such that it includes the selected video frame. The second content can comprise at least a video portion. The second content can be configured to be presented at a second playback speed. In some aspects the second playback speed can be a perceived playback speed. In some aspects, the second playback speed can be faster than the first playback speed. For example, the second playback speed can be a multiple of the first playback speed (e.g., the second playback speed can be a 2× speed, a 4× speed, etc.).

In some aspects, the subset of the frames of the first content can comprise fewer than all of the frames of the first content. For example, the second content can comprise approximately half the frames of the first content, approximately one fourth the frames of the first content, etc.

In step 406, the second content can be modified by replacing one or more frames of the subset with one or more copies of the video frame adjacent to the video frame to form modified second content. In some aspects, replacing one or more frames of the subset with one or more copies of the selected video frame can comprise determining a display duration associated with the video frame. The display duration can comprise a period of time determined to create an impression on a viewer. The display duration can be, for example, a time period between ⅙ of a second and ½ of a second. In some aspects, the display duration can be selected based on one or more of an established custom, a result of focus group and/or usability testing, and/or a negotiated advertising contract. Replacing one or more frames of the subset with one or more copies of the selected video frame can comprise inserting a number of copies of the selected video frame so that when frames are displayed at the first playback speed, the number of copies of the selected video frame are displayed for the display duration. As an example, when the playback speed is 30 frames per second, if the display duration is ⅙ second, then 5 copies of the selected video frame are inserted; if the display duration if ½ second, then 15 copies of the video frame are inserted. Replacing one or more frames the subset with one or more copies of the selected video frame can further comprise removing one or more frames from second content. For example, when the number of copies of the selected video frame are inserted, a corresponding number of frames can be deleted from the second content. In some aspects the removed frames can be contiguous. In some aspects, the removed frames can be disjoint.

In step 408, the first content, the second content, and/or the modified second content can be transmitted to a user device. In some aspects, the first content and the modified second content can be transmitted as part of an MPEG stream. The first content and the modified second content can be transmitted, for example, in response to a user request for the content asset.

Figure 5:
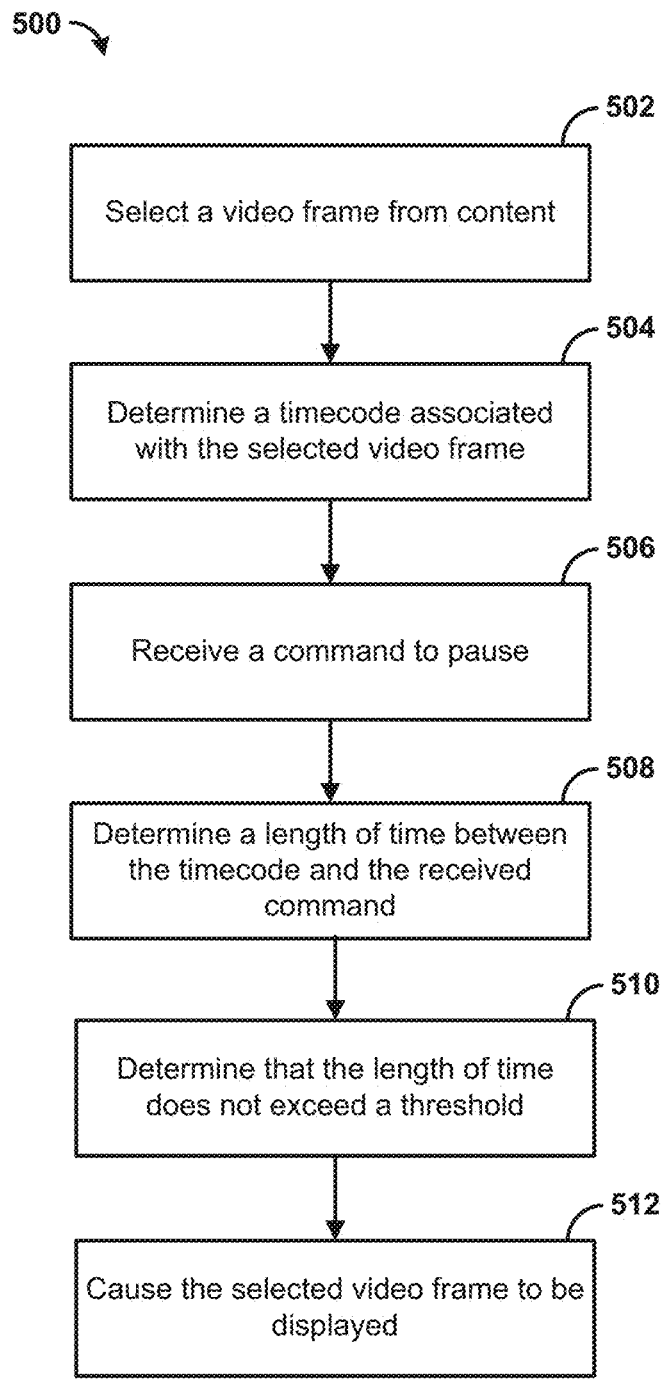
FIG. 5 is a flowchart illustrating an example method.

FIG. 5 shows an example method 500. In step 502, a video frame can be selected from a plurality of video frames of content by a system (e.g., one or more computing devices). In some aspects, the video frame can be selected based on a presence of an item of interest in the video frame. The item of interest can be, for example, a particular product, a company logo, a show logo, a particular still shot from the content, a title screen, and/or the like. In some aspects, the selected video frame can comprise an advertisement. Selecting the video frame can further comprise, for example, determining a timestamp associated with the selected video frame. The timestamp can comprise a relative time within the content at which the selected video frame is to be displayed. In some aspects, the selected video frame can be selected by a content provider. In other aspects, the selected video frame can be selected by a service provider. The content can comprise a video portion and an audio portion.

In some aspects, the method 500 can further comprise a step of processing (e.g., ingesting) a content asset comprising the content. Content processing can comprise obtaining, importing, and processing the content asset for later use and/or storage in a database. Content processing can further comprise altering individual files of the content asset by editing and/or formatting them. In some aspects, the content processing can comprise encoding the received content asset for transmission and display. For example, the content asset can be encoded using, MPEG-2 and/or H.264 video encoding standards. In some aspects, the content asset can comprise the content and metadata associated with the content. The metadata associated with the content can comprise a separate metadata file associated with the content. Alternatively, the metadata associated with the content can be stored as a part of the content.

In some aspects, the selecting the video frame in step 502 can be performed in response to the content processing. For example, the received metadata can comprise an indicator indicating a particular frame of the content. In some aspects, the video frame is selected based on the received metadata In step 504, the system can determine a timecode associated with the selected video frame. In some aspects, the timecode can comprise a relative time offset from a beginning of the content.

In step 506, the content can be transmitted to a user device. In some aspects, the content can be transmitted as part of an MPEG stream. The content can be transmitted, for example, in response to a user request for the content asset. In some aspects, the content can be transmitted for display on the user device.

In step 508, a command can be received from the user device. In some aspects, the command can cause a pause of display of the content at the user device. For example, in some aspects the command can cause at least a temporary stoppage of transmission of the content to the user device. In other aspects, the command can cause the user device to buffer at least a portion of the content transmitted to the user device without continuing playback of the content. The command can be received during display of the content at the user device. In some aspects, a pause point can be determined based on the received command. For example, the pause point can comprise a relative time within the content that the command was received.

In step 508, the system can determine a length of time between the timecode associated with the selected video frame determined in step 504 and the relative time that the command was received in step 508. In some aspects, the length of time can be an absolute value of a difference between the timecode associated with the elected video frame and the relative time that the command was received.

In step 510, the system can determine whether the length of time exceeds a threshold value. In some aspects, the threshold can be an absolute value, such as 1 second, 5 seconds, or the like. In other aspects, the threshold can comprise a percentage of a duration of the content. For example, if the threshold is set at 1% of the duration of the content and the content has a duration of 30 minutes (1800 seconds), then the threshold would be 18 seconds.

In step 512, the selected video frame can be caused to be displayed for a duration of the pause. In some aspects, the selected video frame can be displayed in response to the pause command when it is determined that the length of time does not exceed the threshold value. In other aspects, the video frame can be caused to be displayed regardless of when the pause command was received. For example, the selected frame can be caused to be displayed even when the command was received at a time other than when the selected frame was displayed during playback.

In some aspects, the system can further receive a command to resume display of the content. In some aspects, the command to resume playback can be received from the user device. In response to receiving the command to resume playback, the system can cause display of the content from the user device beginning at the pause point, regardless of the frame displayed by the user device for the duration of the pause. For example, if the selected video frame has a timecode that is later than the pause point, playback can cause display of the content from the pause point, not the selected video frame.

Figure 6:
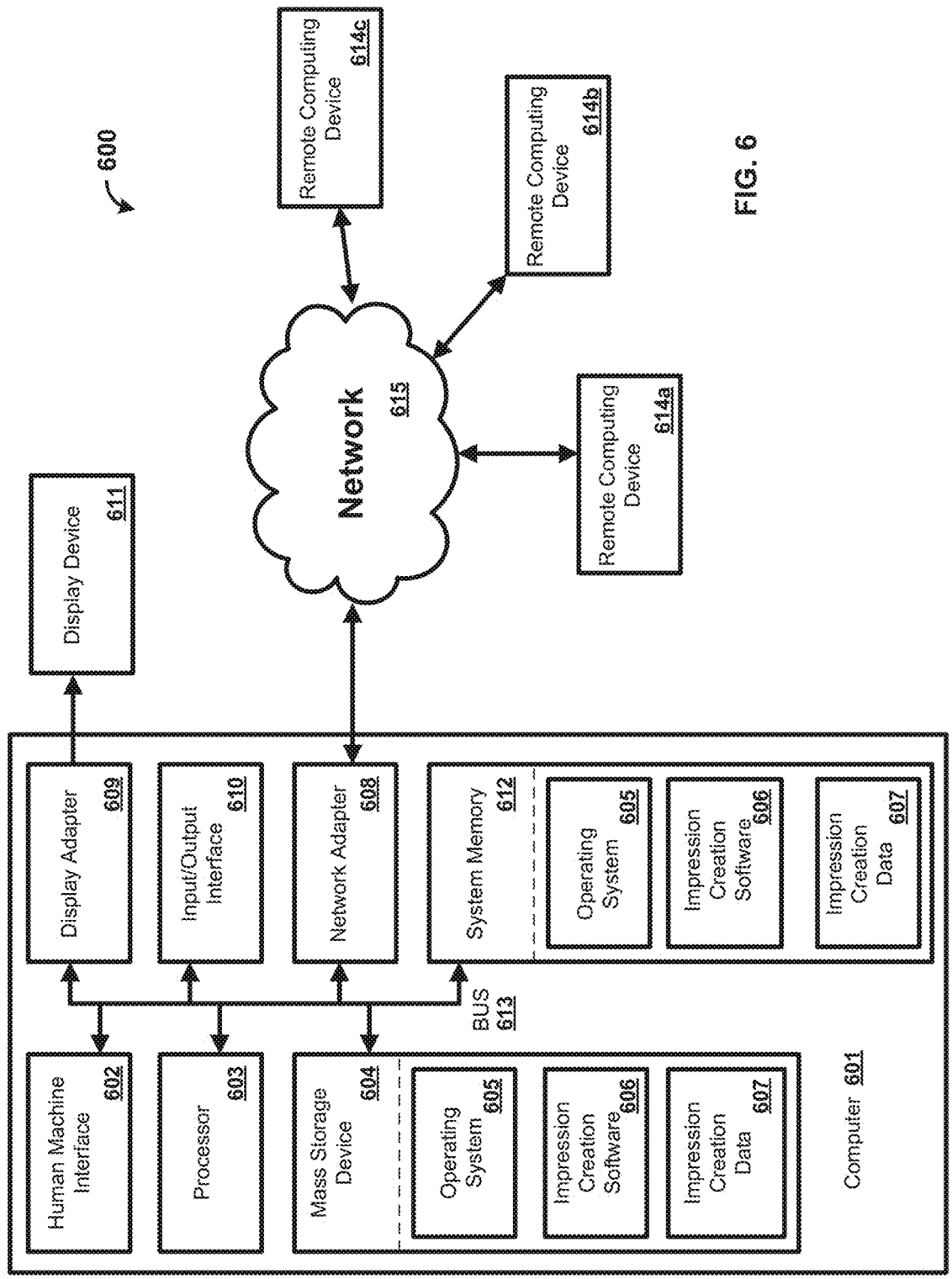
FIG. 6 is a block diagram illustrating an example computing device.

In an exemplary aspect, the methods and systems can be implemented on a computer 601 as illustrated in FIG. 6 and described below. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors 603, a system memory 612, and a system bus 613 that couples various system components including the one or more processors 603 to the system memory 612. The system can utilize parallel computing.

The system bus 613 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the one or more processors 603, a mass storage device 604, an operating system 605, impression creation software 606, impression creation data 607, a network adapter 608, the system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the impression creation data 607 and/or program modules such as the operating system 605 and the impression creation software 606 that are immediately accessible to and/or are presently operated on by the one or more processors 603.

In another aspect, the computer 601 can also comprise other removable/non-removable, volatile/non-volatile computer storage media. By way of example, FIG. 6 illustrates the mass storage device 604 which can provide non-volatile storage of computer code, computer readable instructions, data structures, program modules, and other data for the computer 601. For example and not meant to be limiting, the mass storage device 604 can be a hard disk a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, the operating system 605 and the impression creation software 606. Each of the operating system 605 and the impression creation software 606 (or some combination thereof) can comprise elements of the programming and the impression creation software 606. The impression creation data 607 can also be stored on the mass storage device 604. The impression creation data 607 can be stored in any of one or more databases known in the art. Examples of such databases comprise, DB2®, Microsoft®, Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 603 via the human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, the display device 611 can also be connected to the system bus 613 via an interface, such as the display adapter 609. It is contemplated that the computer 601 can have more than one display adapter 609 and the computer 601 can have more than one display device 611. For example, the display device 611 can be a monitor, an LCD (Liquid Crystal Display), or a projector. In addition to the display device 611, other output peripheral devices can comprise components such as speakers (not shown) and a printer (not shown) which can be connected to the computer 601 via the Input/Output Interface 610. Any step and/or result of the methods can be output in any form to an output device. Such output can be any form of visual representation, including, but not limited to, textual, graphical, animation, audio, tactile, and the like. The display device 611 and computer 601 can be part of one device, or separate devices.

The computer 601 can operate in a networked environment using logical connections to one or more remote computing devices 614a,b,c. By way of example, a remote computing device can be a personal computer, portable computer, smartphone, a server, a router, a network computer, a peer device or other common network node, and so on. Logical connections between the computer 601 and a remote computing device 614a,b,c can be made via a network 615, such as a local area network (LAN) and/or a general wide area network (WAN). Such network connections can be through the network adapter 608. The network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the one or more processors 603 of the computer. An implementation of the impression creation software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology. CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   selecting, by a computing device based on metadata indicating a presence of an item of interest in a video frame of a plurality of video frames of first content, the video frame, wherein the first content is associated with a first playback speed;
   determining, based on a second playback speed different from the first playback speed, a subset of video frames of the plurality of video frames of the first content, wherein the subset of video frames comprises the selected video frame;
   determining, by the computing device, and based on the determined subset of video frames, second content, wherein the second content is associated with the second playback speed;
   contiguously inserting, by the computing device based on a time duration the selected video frame is to be displayed at the second playback speed, a quantity of one or more copies of the selected video frame into the second content to form modified second content;
   removing, from the modified second content, a quantity of video frames corresponding to the quantity of the one or more copies of the selected video frame; and
   sending, by the computing device to a user device, the modified second content.

2. The method of claim 1, further comprising ingesting the first content, wherein the selected video frame is selected based on ingesting the first content.

3. The method of claim 2, wherein ingesting the first content comprises receiving the first content and the metadata, and wherein the metadata is associated with the first content.

4. The method of claim 1, further comprising determining the time duration the selected video frame is to be displayed at the second playback speed, wherein the quantity of the one or more copies of the selected video frame are contiguously inserted such that a display duration of the quantity of the one or more copies of the selected video frame at the second playback speed is equal to the time duration.

5. The method of claim 1, wherein the selected video frame comprises an advertisement.

6. The method of claim 1, wherein the computing device is associated with at least one of: a content provider or a service provider.

7. The method of claim 1, wherein the second playback speed comprises fast forwarding the second content, and wherein the quantity of the one or more copies of the selected video frame are contiguously inserted chronologically after the selected video frame.

8. The method of claim 1, wherein the quantity of the one or more copies of the selected video frame correlates to the second playback speed.

9. A method, comprising:
selecting, by a computing device based on metadata indicating a presence of an item of interest in a video frame of a plurality of video frames of first content, the video frame, wherein the first content is associated with a first playback speed;
determining, based on a second playback speed different from the first playback speed, a subset of video frames of the plurality of video frames of the first content, wherein the subset of video frames comprises the selected video frame;
determining, by the computing device, and based on the determined subset of video frames, second content;
contiguously replacing, by the computing device, based on a time duration the selected video frame is to be displayed at the second playback speed, one or more frames of the second content with a quantity of one or more copies of the selected video frame in the second content to form modified second content, wherein the second playback speed is different than the first playback speed;
removing, from the modified second content, a quantity of video frames corresponding to the quantity of the one or more copies of the selected video frame; and
sending, to a user device, the modified second content.

10. The method of claim 9, further comprising determining the time duration the selected video frame is to be displayed at the second playback speed, wherein contiguously replacing the one or more frames of the second content with the quantity of the one or more copies of the selected video frame causes a display duration of the quantity of the one or more copies of the selected video frame at the second playback speed to be equal to the time duration.

11. The method of claim 9, wherein the selected video frame comprises an advertisement.

12. The method of claim 9, wherein the computing device is associated with at least one of: a content provider or a service provider.

13. The method of claim 9, further comprising ingesting the first content, wherein the selected video frame is selected based on ingesting the first content.

14. The method of claim 13, wherein ingesting the first content comprises receiving the first content and the metadata, and wherein the metadata is associated with the first content.

15. The method of claim 9, wherein the second playback speed comprises fast forwarding the second content, and wherein contiguously replacing the one or more frames of the second content with the quantity of the one or more copies of the selected video frame comprises chronologically replacing the one or more frames of the second content after the selected video frame.

16. The method of claim 9, wherein the quantity of the one or more copies of the selected video frame correlates to the second playback speed.

17. An apparatus, comprising:
one or more processors; and
a memory storing processor executable instruction that, when executed by the one or more processors, cause the apparatus to:
select, based on metadata indicating a presence of an item of interest in a video frame of a plurality of video frames of first content, the video frame, wherein the first content is associated with a first playback speed;
determine, based on a second playback speed different from the first playback speed, a subset of video frames of the plurality of video frames of the first content, wherein the subset of video frames comprises the selected video frame;
determine, based on the determined subset of video frames, second content, wherein the second content is associated with the second playback speed;
contiguously insert, based on a time duration the selected video frame is to be displayed at the second playback speed, a quantity of one or more copies of the selected video frame into the second content to form modified second content;
remove, from the modified second content, a quantity of video frames corresponding to the quantity of the one or more copies of the selected video frame; and
send, to a user device, the modified second content.

18. The apparatus of claim 17, wherein the processor executable instructions, when executed by the one or more processors, further cause the apparatus to ingest the first content, wherein the selected video frame is selected based on ingesting the first content.

19. The apparatus of claim 18, wherein the processor executable instructions, when executed by the one or more processors, further cause the apparatus to ingest the first content, further cause the apparatus to receive the first content and the metadata, and wherein the metadata is associated with the first content.

20. The apparatus of claim 17, wherein the processor executable instructions, when executed by the one or more processors, further cause the apparatus to determine the time duration the selected video frame is to be displayed at the second playback speed, wherein the quantity of the one or more copies of the selected video frame are contiguously inserted such that a display duration of the quantity of the one or more copies of the selected video frame at the second playback speed is equal to the time duration.

21. The apparatus of claim 17, wherein the selected video frame comprises an advertisement.

22. The apparatus of claim 17, wherein the apparatus is associated with at least one of: a content provider or a service provider.

23. The apparatus of claim 17, wherein the second playback speed comprises fast forwarding the second content, and wherein the quantity of one or more copies of the selected video frame are inserted chronologically after the selected video frame.

24. The apparatus of claim 17, wherein the quantity of the one or more copies of the selected video frame correlates to the second playback speed.

25. An apparatus, comprising:
one or more processors; and
a memory storing processor executable instruction that, when executed by the one or more processors, cause the apparatus to:
select, based on metadata indicating a presence of an item of interest in a video frame of a plurality of video frames of first content, the video frame, wherein the first content is associated with a first playback speed;
determine, based on a second playback speed different from the first playback speed, a subset of video frames of the plurality of video frames of the first content, wherein the subset of video frames comprises the selected video frame;

determine, based on the determined subset of video frames, second content;

contiguously replace, based on a time duration the selected video frame is to be displayed at the second playback speed, one or more frames of the second content with a quantity of one or more copies of the selected video frame in the second content to form modified second content, wherein the second playback speed is different than the first playback speed;

remove, from the modified second content, a quantity of video frames corresponding to the quantity of the one or more copies of the selected video frame; and send, to a user device, the modified second content.

26. The apparatus of claim 25, wherein the processor executable instructions, when executed by the one or more processors, further cause the apparatus to determine the time duration the selected video frame is to be displayed at the second playback speed, and wherein the processor executable instructions, that when executed by the one or more processors, cause the apparatus to contiguously replace the one or more frames of the second content with the quantity of the one or more copies of the selected video frame causes a display duration of the one or more copies of the selected video frame at the second playback speed to be equal to the time duration.

27. The apparatus of claim 25, wherein the selected video frame comprises an advertisement.

28. The apparatus of claim 25, wherein the apparatus is associated with at least one of: a content provider or a service provider.

29. The apparatus of claim 25, wherein the processor executable instructions, when executed by the one or more processors, further cause the apparatus to ingest the first content, wherein the selected video frame is selected based on ingesting the first content.

30. The apparatus of claim 29, wherein the processor executable instructions, when executed by the one or more processors that cause the apparatus to ingest the first content further cause the apparatus to receive the first content and the metadata, and wherein the metadata is associated with the first content.

31. The apparatus of claim 25, wherein the second playback speed comprises fast forwarding the second content, and wherein the processor executable instructions, that when executed by the one or more processors, cause the apparatus to contiguously replace the one or more frames of the second content with the quantity of the one or more copies of the selected video frame cause the apparatus to chronologically replace the one or more frames of the second content after the selected video frame.

32. The apparatus of claim 25, wherein the quantity of the one or more copies of the selected video frame correlates to the second playback speed.

\* \* \* \* \*